United States Patent
Jiang et al.

(10) Patent No.: US 9,146,295 B2
(45) Date of Patent: Sep. 29, 2015

(54) ACOUSTIC RANGING SYSTEM USING ATMOSPHERIC DISPERSION

(75) Inventors: Qin Jiang, Oak Park, CA (US); Michael J. Daily, Thousand Oaks, CA (US); Richard Michael Kremer, Ramona, CA (US)

(73) Assignee: THE BOEING COMPANY, Chicago, IL (US)

( * ) Notice: Subject to any disclaimer, the term of this patent is extended or adjusted under 35 U.S.C. 154(b) by 377 days.

(21) Appl. No.: 13/480,192

(22) Filed: May 24, 2012

(65) Prior Publication Data

US 2013/0317669 A1 Nov. 28, 2013

(51) Int. Cl.
*G01S 3/80* (2006.01)
*G01S 3/00* (2006.01)
*G01S 11/14* (2006.01)

(52) U.S. Cl.
CPC ... *G01S 3/80* (2013.01); *G01S 3/00* (2013.01); *G01S 11/14* (2013.01)

(58) Field of Classification Search
CPC ........... G01S 11/14; G01S 11/00; G01S 3/00; G01S 3/80
USPC ................... 701/300, 301; 367/118, 125, 127
See application file for complete search history.

(56) References Cited

U.S. PATENT DOCUMENTS

| | | | |
|---|---|---|---|
| 4,558,439 A | 12/1985 | Guedesen | |
| 5,912,862 A | 6/1999 | Gustavsen et al. | |
| 5,930,202 A * | 7/1999 | Duckworth et al. | 367/127 |
| 6,178,141 B1 * | 1/2001 | Duckworth et al. | 367/127 |
| 6,400,647 B1 * | 6/2002 | Huntress | 367/136 |
| 7,385,932 B2 * | 6/2008 | Dodds et al. | 370/248 |
| 7,495,998 B1 * | 2/2009 | Deligeorges et al. | 367/127 |
| 7,528,768 B2 * | 5/2009 | Wakayama et al. | 342/196 |
| 7,602,329 B2 * | 10/2009 | Manderville et al. | 342/45 |
| 7,606,115 B1 * | 10/2009 | Cline et al. | 367/124 |
| 8,279,112 B2 * | 10/2012 | Carrick | 342/127 |
| 8,325,562 B2 * | 12/2012 | Showen | 367/124 |
| 8,461,986 B2 * | 6/2013 | Snyder | 340/540 |
| 2006/0007423 A1 | 1/2006 | Guruprasad | |
| 2008/0309546 A1 * | 12/2008 | Wakayama et al. | 342/129 |
| 2009/0097360 A1 | 4/2009 | Jeong et al. | |
| 2009/0308236 A1 * | 12/2009 | Matveev | 89/1.809 |
| 2010/0121574 A1 * | 5/2010 | Ariyur et al. | 701/301 |
| 2010/0226210 A1 * | 9/2010 | Kordis et al. | 367/127 |
| 2010/0284249 A1 | 11/2010 | Steadman | |
| 2011/0210872 A1 | 9/2011 | Molander | |
| 2013/0186253 A1 * | 7/2013 | Nielsen et al. | 84/267 |
| 2014/0025284 A1 * | 1/2014 | Roberts | 701/300 |

OTHER PUBLICATIONS

Extended European Search Report, dated Sep. 10, 2013, regarding Application No. EP13167920.1, 6 pages.
Bass et al., "Atmospheric absorption of sound: Update," The Journal of the Acoustical Society of America, vol. 88, No. 4, Oct. 1990, pp. 2019-2021.

(Continued)

*Primary Examiner* — John Q Nguyen
*Assistant Examiner* — Michael Whalen
(74) *Attorney, Agent, or Firm* — Yee & Associates, P.C.

(57) ABSTRACT

A method and apparatus for processing sound from a sound source. The sound from the sound source is detected. Harmonics in the sound from the sound source are identified. A distance to the sound source is identified using the harmonics and a number of atmospheric conditions.

19 Claims, 6 Drawing Sheets

(56) References Cited

OTHER PUBLICATIONS

Yasi, "An Algorithm for Extracting the Relative Phase of Harmonics from a Periodic Digital Signal," Department of Physics, University of Illinois at Urbana-Champaign, Aug. 2004, 9 pages, accessed Apr. 24, 2012, http://online.physics.uiuc.edu/courses/phys193/NSF_REU_Reports/2004_reu/Joe_Yasi_Final_Paper.pdf.

Bass et al., "Atmospheric absorption of sound: Further developments," J. Acoust. Soc. Am., vol. 97, Issue 1, Jan. 1995, pp. 680-683.

Capon, "High-Resolution Frequency-Wavenumber Spectrum Analysis," Proceedings of the IEEE, vol. 57, No. 8, Aug. 1969, pp. 1408-1418.

Roy et al., "ESPRIT—Estimation of Signal Parameters Via Rotational Invariance Techniques," IEEE Transaction on Acoustics, Speech and Signal Processing, vol. 37, No. 7, Jul. 1989, pp. 984-995.

Schmidt, "Multiple Emitter Location and Signal Parameter Estimation," IEEE Transactions on Antennas and Propagation, vol. AP-34, No. 3, Mar. 1986, pp. 276-280.

* cited by examiner

ACOUSTIC RANGING SYSTEM USING ATMOSPHERIC DISPERSION

BACKGROUND INFORMATION

1. Field

The present disclosure relates generally to acoustic systems and, in particular, to acoustic ranging systems. Still more particularly, the present disclosure relates to a method and apparatus for identifying a distance to a sound source using passive acoustic sensors.

2. Background

In operating unmanned aerial vehicles, sensor systems are used to navigate the unmanned aerial vehicles during flight. These sensor systems may be used by an unmanned aerial vehicle to sense and avoid objects along the flight path of the unmanned aerial vehicle. These objects may be, for example, other aircraft, structures, landmarks, terrain, or some other type of object. To sense these objects, the sensor system may be used to detect the distance of an object from the unmanned aerial vehicle at a point in time.

Some sensor systems may include different types of sensors. Active sensor systems use actively transmitted signals to detect objects. The unmanned aerial vehicle may use an active sensor system such as a radar system. A radar system may use a pulse of electromagnetic radiation to identify a direction and distance of an object from the unmanned aerial vehicle. The distance is determined by the length of time it takes the pulse to return from the object.

This type of sensor system, however, may be undesirable for use in an unmanned aerial vehicle. For example, with a radar system, the emission of electromagnetic radiation makes it easier to identify a presence of the unmanned aerial vehicle. Currently, an unmanned aerial vehicle using a radar system may be detected by undesired parties such as a hostile aircraft or a ground missile station. For example, a hostile aircraft or a ground missile station may identify the presence of the unmanned aerial vehicle by detecting the pulse of electromagnetic radiation emitted by the radar system in the unmanned aerial vehicle. This detection of the unmanned aerial vehicle may be undesirable when the unmanned aerial vehicle is used in a surveillance mission over hostile territories.

Further, a radar system may include more components than desired. For example, the components in a radar system may be larger in size and heavier in weight than desired for an unmanned aerial vehicle. Additionally, a radar system may take up more space than desired in an unmanned aerial vehicle. Further, a radar system may use more energy than desired when transmitting electromagnetic radiation.

Therefore, it would be desirable to have a method and apparatus that takes into account at least one of the issues discussed above as well as possibly other issues.

SUMMARY

In one illustrative embodiment, a method for processing sound from a sound source is present. The sound from the sound source is detected. Harmonics in the sound from the sound source are identified. A distance to the sound source is identified using the harmonics and a number of atmospheric conditions.

In another illustrative embodiment, a method for managing flight of a first unmanned aerial vehicle relative to a second unmanned aerial vehicle is present. A sound from the second unmanned aerial vehicle is detected. Harmonics in the sound from the second unmanned aerial vehicle are identified. A distance from the first unmanned aerial vehicle to the second unmanned aerial vehicle is identified using the harmonics and a number of atmospheric conditions. The flight of the first unmanned aerial vehicle is managed using the distance from the first unmanned aerial vehicle to the second unmanned aerial vehicle.

In yet another illustrative embodiment, an apparatus comprises a sensor system and a sounds processor. The sensor system is configured to detect a sound from a sound source. The sound processor is configured to identify harmonics in the sound from the sound source. The sound processor is further configured to identify a distance to the sound source using the harmonics and a number of atmospheric conditions.

The features, and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that with aircraft, identifying a distance to another aircraft may be useful in managing flight of the aircraft. For example, knowing a distance and direction from one unmanned aerial vehicle to another unmanned aerial vehicle may be useful to perform collision avoidance between the unmanned aerial vehicles. This collision avoidance may be performed automatically by a controller or by an operator.

The illustrative embodiments recognize and take into account that when an active sensor system such as a radar system is undesirable, passive sensor systems may be used. For example, a passive sensor system may be a passive acoustic sensor system.

The illustrative embodiments recognize and take into account that passive acoustic sensors, such as microphones, may be used in identifying a direction to a sound source from the passive acoustic sensor systems. For example, sound detected by an acoustic sensor system may be used to identify direction information such as a bearing, azimuth and elevation, or some combination thereof of the sound source.

The illustrative embodiments recognize and take into account that currently available acoustic sensor systems are unable to identify a distance to a sound source when the acoustic sensor system is a passive acoustic sensor system.

Further, the illustrative embodiments recognize and take into account that the issue with currently available passive acoustic sensor systems applies to other uses of these systems in other environments in addition to managing aircraft. For example, the illustrative embodiments recognize and take into account that the issues with identifying a distance to a sound source are present in passive acoustic sensor systems that are configured to monitor for sounds, such as gun fire, explosions, or both.

Currently, a passive acoustic sensor system is able to identify a presence of a sound source, such as a gun or explosive device from comparing sounds that are detected with acoustic signatures of gun fire and explosions. The passive acoustic sensor system is also able to identify a direction from a passive acoustic sensor system to a sound source. However, the passive acoustic sensor system is unable to identify a distance. As a result, a location of the gunfire, explosion, or both cannot be identified using a currently available passive acoustic sensor system.

Thus, the illustrative embodiments provide a method and apparatus for identifying a sound source. In particular, the illustrative embodiments provide a method and apparatus for identifying a distance to a sound source with a passive acoustic sensor system. In one illustrative embodiment, a sound is detected from the sound source. Harmonics in the sound from the sound source are identified. The distance to the sound source is identified using the harmonics and a number of atmospheric conditions.

Figure 1:
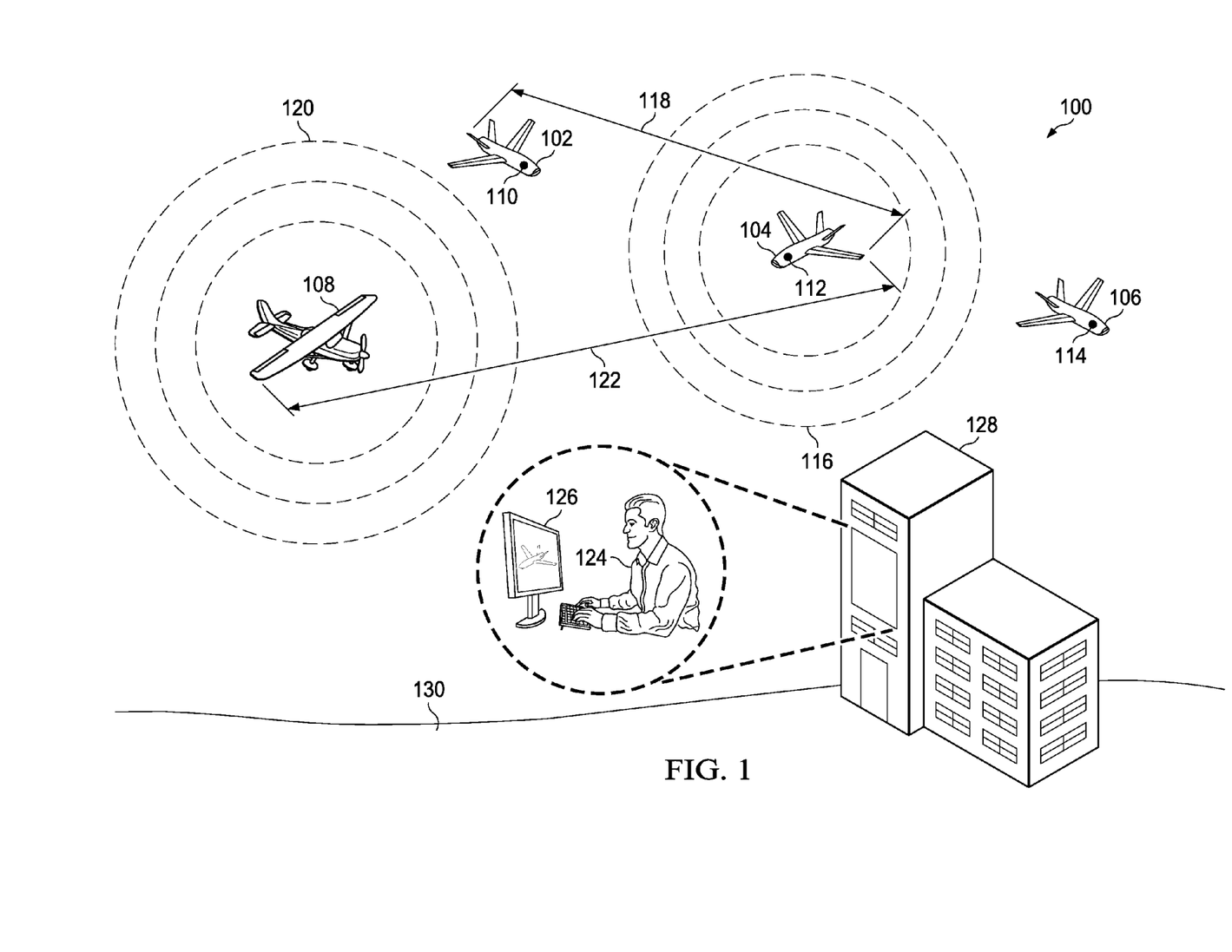
FIG. 1 is an illustration of an aircraft environment in accordance with an illustrative embodiment.

With reference now to the figures and, in particular, with reference to FIG. 1, an illustration of an aircraft environment is depicted in accordance with an illustrative embodiment. Aircraft environment 100 is an example of one environment in which information about a distance from an aircraft to a sound source may be identified. Specifically, aircraft environment 100 is an example of one environment in which information about a distance from the aircraft to another aircraft may be identified.

In this illustrative example, aircraft environment 100 includes aircraft in the form of unmanned aerial vehicle 102, unmanned aerial vehicle 104, unmanned aerial vehicle 106, and manned airplane 108. In these illustrative examples, unmanned aerial vehicle 102 includes acoustic sensor system 110, unmanned aerial vehicle 104 includes acoustic sensor system 112, and unmanned aerial vehicle 106 includes acoustic sensor system 114.

In these illustrative examples, these acoustic sensor systems may be implemented in accordance with an illustrative embodiment. When implemented in accordance with an illustrative embodiment, these sensor systems provide a capability to identify a distance to a sound source.

For example, unmanned aerial vehicle 104 may be a sound source. Unmanned aerial vehicle 104 generates sound 116. Sound 116 may be generated by an engine in unmanned aerial vehicle 104. Sound 116 is detected by acoustic sensor system 110. Acoustic sensor system 110 is configured to identify harmonics in sound 116 from unmanned aerial vehicle 104.

Additionally, acoustic sensor system 110 is configured to identify distance 118 to unmanned aerial vehicle 104 from unmanned aerial vehicle 102. Distance 118 is identified by acoustic sensor system 110 using the harmonics identified from sound 116 of unmanned aerial vehicle 104 and a number of atmospheric conditions.

A number of atmospheric conditions may affect the speed in which the harmonics travel in the air in these illustrative examples. In particular, each harmonic in the harmonics in sound 116 travels at a different speed with respect to other harmonics in sound 116.

In this manner, distance 118 may be identified from unmanned aerial vehicle 102 to unmanned aerial vehicle 104. In a similar fashion, unmanned aerial vehicle 104 may detect sound 120 generated by manned airplane 108. Acoustic sensor system 112 may identify harmonics in sound 120 and identify distance 122 from unmanned aerial vehicle 104 to manned airplane 108 using the harmonics and a number of atmospheric conditions. Similarly, acoustic sensor system 114 in unmanned aerial vehicle 106 may also use sound 116 generated by unmanned aerial vehicle 104 and sound 120 generated by manned airplane 108 to detect distances to these aircrafts. This distance information may be especially useful for managing operation of unmanned aerial vehicle 102, unmanned aerial vehicle 104, and unmanned aerial vehicle 106.

For example, operator 124 may use controller 126 to control operation of these unmanned aerial vehicles. In this illustrative example, operator 124 and controller 126 are located in building 128 on ground 130.

In these illustrative examples, controller 126 is a hardware device and may include software. Controller 126 may be implemented using one or more computers and is configured to manage the operation of unmanned aerial vehicle 102, unmanned aerial vehicle 104, and unmanned aerial vehicle 106 in these illustrative examples.

With information such as distance 118 between unmanned aerial vehicle 102 and unmanned aerial vehicle 104, operator 124 may use distance 118 to perform collision avoidance. For example, operator 124 may determine whether distance 118 between unmanned aerial vehicle 102 and unmanned aerial vehicle 104 is an undesired distance. Collision avoidance also may be performed with respect to manned airplane 108.

In another illustrative example, one or more of unmanned aerial vehicle 102, unmanned aerial vehicle 104, and unmanned aerial vehicle 106 may automatically manage its flight path to avoid collision with each other or other aircraft. In this example, operator 124 is not needed for performing collision avoidance.

Further, the performance of collision avoidance in this illustrative example may be performed with information such as azimuth and elevation to the sound source in addition to distance. With this additional information, locations of a sound source also may be identified.

In these illustrative examples, azimuth is an angular measurement in a spherical coordinate system on a horizontal reference plane. Elevation is an angular measurement of the distance between a sound source and a horizontal reference plane. The location may be identified in two dimensions or three dimensions depending on the amount of additional information that is present.

The illustration of aircraft environment 100 in FIG. 1 is provided as an example of one aircraft environment in which an acoustic sensor system may be implemented. Of course, the different illustrative embodiments may be implemented in other environments. For example, without limitation, the acoustic sensor systems may be implemented in environments such as security environments, surveillance environments, and other suitable environments. In these environments, identifying locations of gunshots and explosions may be useful. In particular, identifying the location of a gun or explosive device may be useful in performing operations in these types of environments. With the ability to identify distances in addition to azimuth, elevation, or some combination thereof, locations of sound sources may be more easily identified using passive acoustic sensor systems. Additionally, any type of directional measurement system may be used in addition to or in place of a spherical system in which azimuth and elevation define directions.

Figure 2:
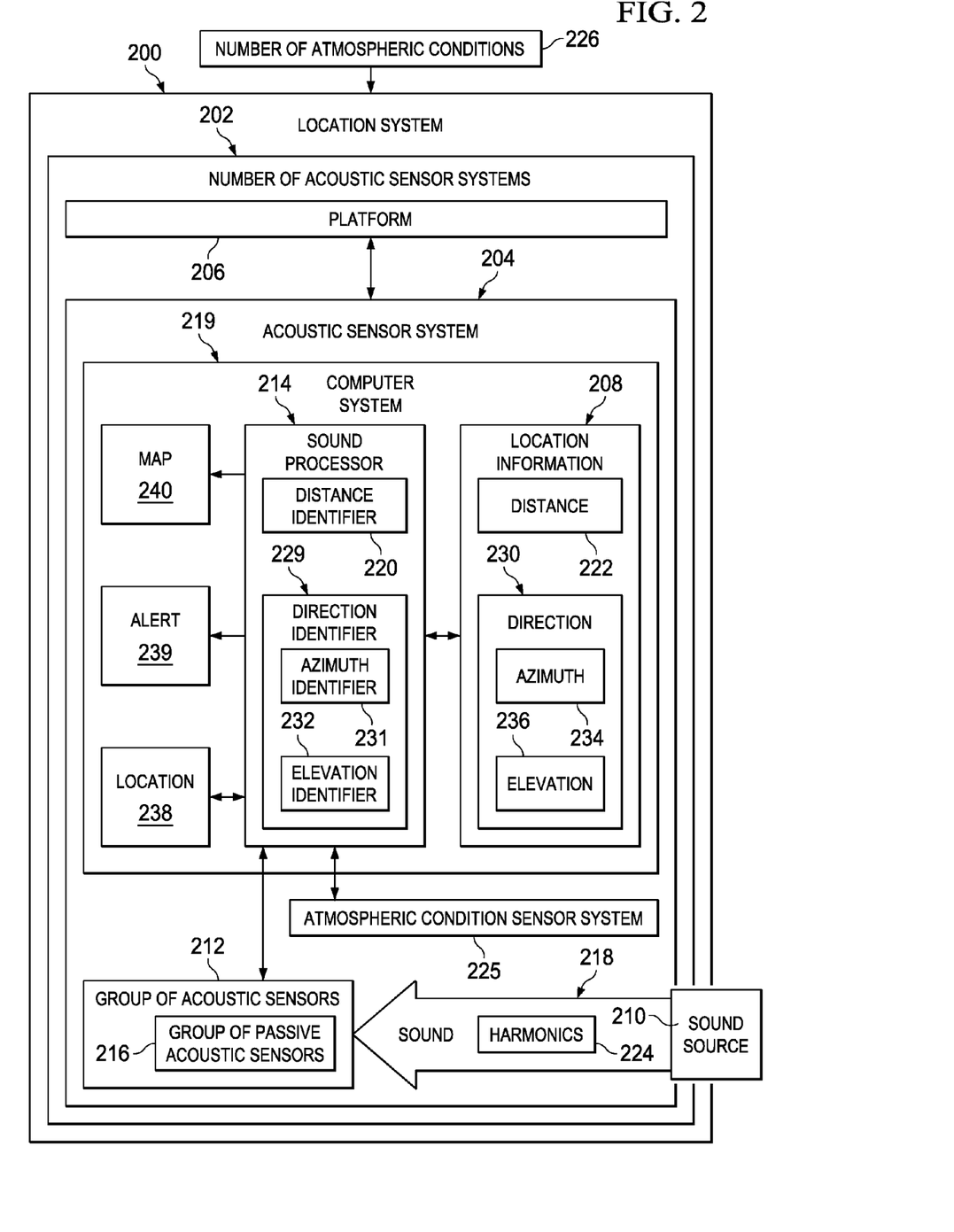
FIG. 2 is an illustration of a block diagram of a location system in accordance with an illustrative embodiment.

With reference now to FIG. 2, an illustration of a block diagram of a location system is depicted in accordance with an illustrative embodiment. In this illustrative example, location system 200 may be implemented in various environments including aircraft environment 100 in FIG. 1. Location system 200 may be an acoustic ranging system that identifies distances to sound sources. Location system 200 is comprised of number of acoustic sensor systems 202 in this depicted example. As used herein, a "number" when used with reference to items means one or more items. For example, number of acoustic sensor systems 202 is one or more acoustic sensor systems.

In this illustrative example, acoustic sensor system 204 in number of acoustic sensor systems 202 is associated with platform 206. Platform 206 may be considered part of location system 200 or a separate component from location system 200 depending on the particular implementation.

Platform 206 may take a number of different forms. For example, platform 206 may take the form of an aircraft such as one of the aircraft depicted in aircraft environment 100 in FIG. 1. Additionally, platform 206 may be a mobile platform, a stationary platform, a land-based structure, an aquatic-based structure, or a space-based structure. More specifically, platform 206 may be a surface ship, a tank, a helicopter, a personnel carrier, a train, a spacecraft, a space station, a satellite, a submarine, an automobile, a power plant, a bridge, a dam, a manufacturing facility, a building, or another suitable object.

In this illustrative example, acoustic sensor system 204 may be used to generate location information 208 for sound source 210. As depicted, acoustic sensor system 204 may comprise group of acoustic sensors 212 and sound processor 214.

In particular, group of acoustic sensors 212 comprises one or more acoustics sensors. In this illustrative example, group of acoustic sensors 212 takes the form of group of passive acoustic sensors 216. In other words, group of acoustic sensors 212 do not transmit sound signals or other types of energy when detecting sound 218 generated by sound source 210. With the use of group of passive acoustic sensors 216, energy is not emitted by group of acoustic sensors 212. As a result, detectability of platform 206 may be reduced.

In these illustrative examples, group of acoustic sensors 212 may be one or more microphones. These microphones may take various forms. For example, the microphones may be omnidirectional microphones, unidirectional microphones, cardioid microphones, and other suitable types of microphones.

In these illustrative examples, sound source 210 may take a number of different forms. For example, sound source 210 may be an aircraft, an unmanned aerial vehicle, a gun, or another suitable type of sound source that may be of interest.

In these illustrative examples, sound processor 214 is hardware and also may include software. As depicted, sound processor 214 may be implemented in a number of different ways. For example, sound processor 214 may be implemented in computer system 219. Computer system 219 may be one or more computers. When more than one computer is present, those computers may be in communication with each other through a communications medium such as a network. Sound processor 214 is configured to detect and process sound 218 to identify location information for sound source 210.

Operations performed by sound processor 214 may be implemented in software, hardware, or some combination thereof. When software is used, the operations performed by sound processor 214 may be implemented in program code configured to be run on the processor. When hardware is used, the hardware may include circuits that operate to perform the operations for sound processor 214.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, sound processor 214 includes distance identifier 220. Distance identifier 220 is hardware, software, or both within sound processor 214. Distance identifier 220 is configured to identify distance 222 to sound source 210. In these illustrative examples, location information 208 comprises distance 222 but may also include other information depending on the implementation.

In particular, distance 222 to sound source 210 is the distance from group of acoustic sensors 212 to sound source 210. More specifically, distance 222 may be a distance from an acoustic sensor in group of acoustic sensors 212 to sound source 210. In these illustrative examples, with acoustic sensor system 204 being associated with platform 206, distance 222 also may be considered to be the distance between platform 206 and sound source 210.

Atmospheric condition sensor system 225 is a hardware component in acoustic sensor system 204 and is configured to detect number of atmospheric conditions 226 in the environment around acoustic sensor system 204. Number of atmospheric conditions 226 may be, for example, at least one of temperature, humidity, pressure, and other suitable atmospheric conditions.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

In this illustrative example, sound processor 214 is configured to process sound 218 detected by group of acoustic sensors 212. When sound 218 is detected by group of acoustic sensor 212, sound 218 is detected by one or more acoustic sensors in group of acoustic sensors 212.

Sound processor 214 is configured to identify harmonics 224 in sound 218 from sound source 210. In these illustrative examples, sound source 210 may be any sound source that generates harmonics 224 in sound 218. Further, sound processor 214 is configured to identify distance 222 to sound source 210 using harmonics 224 and number of atmospheric conditions 226. Number of atmospheric conditions 226 is one or more conditions in the atmosphere that may cause atmospheric dispersion in a manner that affects the propagation of harmonics 224.

A harmonic in harmonics 224 is a frequency from the frequencies in sound 218. In particular, this frequency may be an integer multiple of a fundamental frequency. Number of atmospheric conditions 226 may affect the speed at which a harmonic travels, thus causing atmospheric dispersion. As a result, sound processor 214 is able to identify distance 222 to sound source 210 using harmonics 224 taking into account the manner in which number of atmospheric conditions 226 affects harmonics 224.

In these illustrative examples, sound processor 214 also may include other components to generate additional information for location information 208 in addition to distance 222. For example, sound processor 214 also may include direction identifier 229. Direction identifier 229 is configured to identify direction 230 to sound source 210 from group of acoustic sensors 212. Direction 230 may be two-dimensional or three-dimensional depending on the particular implementation.

In these illustrative examples, direction identifier 229 may implement any number of known direction estimation processes. For example, direction identifier 229 may use one or more arrival angle estimation algorithms with group of acoustic sensors 212, such as multiple emitter location and signal parameter estimation algorithms. Group of acoustic sensors 212 may be arranged in an array such as a planar array.

Direction identifier 229 also may use other types of algorithms such as a minimum variance distortionless response algorithm. In yet another illustrative example, direction identifier 229 may estimate directions using rotational invariance techniques.

In these illustrative examples, direction identifier 229 may comprise at least one of azimuth identifier 231 and elevation identifier 232. Azimuth identifier 231 is configured to identify azimuth 234 in location information 208. Azimuth 234 is azimuth to sound source 210. Azimuth 234 is a direction with respect to a horizontal plane in these illustrative examples. Azimuth 234 may be measured in degrees in these illustrative examples.

Elevation identifier 232 is configured to identify elevation 236 in location information 208. Elevation 236 is an elevation to sound source 210. In particular, elevation 236 is an elevation from the perspective of platform 206 in these illustrative examples. Elevation 236 is an altitude or change from the horizontal plane for which azimuth 234 is identified in these illustrative examples. Elevation 236 also may be measured in degrees.

Azimuth 234 and elevation 236 may form a bearing for direction 230. In some illustrative examples, the bearing may be in two-dimensions such as a compass direction with angle information. In other illustrative examples, azimuth 234 and elevation 236 may be measured using other units such as mils, grad, or other suitable units.

With at least one of azimuth 234 and elevation 236, along with distance 222, location 238 may be identified for sound source 210 using location information 208. If azimuth 234, elevation 236, and distance 222 are present, location 238 may be in three-dimensional space. If only one of azimuth 234 and elevation 236 is present with distance 222, then location 238 may be a two-dimensional location on a plane.

If all three of these types of measurements are not present in location information 208, other acoustic sensor systems in number of acoustic sensor systems 202 may also detect sound 218 and generate locations that may be used to identify location 238 of sound source 210 in three-dimensions. Additionally, with the use of multiple acoustic sensor systems in location system 200, a surveillance system may be set up to identify movements of sound source 210.

In one illustrative example, sound processor 214 may generate alert 239 based on distance 222. For example, when distance 222 is used for collision avoidance, alert 239 is generated when distance 222 is less than a desired distance between platform 206 and sound source 210. Alert 239 may be based solely on distance 222, but may also be based on other conditions. For example, alert 239 may be generated when distance 222 is less than a desired distance and both platform 206 and sound source 210 are at the same altitude. This form of alert 239 may be useful to an operator managing multiple unmanned aerial vehicles.

In another illustrative example, sound processor 214 may generate map 240 with the identification of location 238 of sound source 210. Map 240 may be used by an operator of platform 206 or some other operator in another location to identify a location of sound source 210. Map 240 may be useful when the operator of platform 206 performs surveillance or other types of monitoring operations.

In these illustrative examples, acoustic sensor system 204 may identify location 238 of sound source 210 faster than other passive systems such as passive radar. As a result, acoustic sensor system 204 also may be used to track movement. Acoustic sensor system 204 does not require as much time to identify a location of sound source 210 as other types of passive sensor systems. With other passive sensor systems, the amount of time needed to identify a location of sound source 210 may occur after sound source 210 has traveled to still another location. As a result, acoustic sensor system 204 provides an ability to track movement of sound source 210 more accurately as compared to currently available passive sensor systems such as passive radar systems. Further, the cost may be less with passive sensor systems because passive acoustic sensors may cost less than passive radar sensors.

Figure 3:
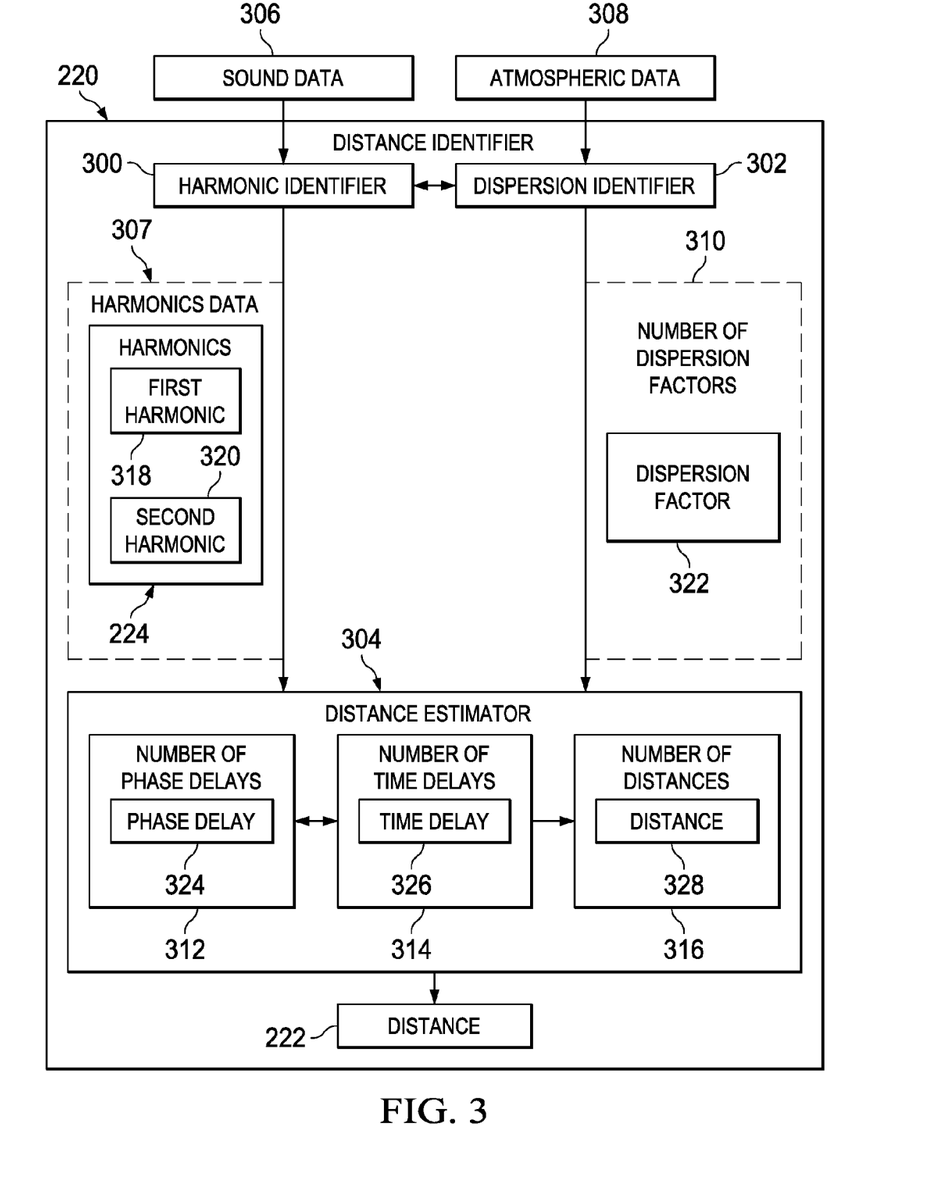
FIG. 3 is an illustration of a block diagram of a distance identifier in a sound processor in accordance with an illustrative embodiment.

Turning now to FIG. 3, an illustration of a block diagram of a distance identifier in a sound processor is depicted in accordance with an illustrative embodiment. In this illustrative example, examples of components that may be implemented in distance identifier 220 in sound processor 214 are shown. In this illustrative example, distance identifier 220 includes harmonic identifier 300, dispersion identifier 302, and distance estimator 304.

Harmonic identifier 300 receives sound data 306 from group of acoustic sensors 212. Sound data 306 is data generated by group of acoustic sensors 212 in response to detecting sound 218.

Harmonic identifier 300 is configured to identify harmonics 224 in sound 218 using sound data 306. In these illustrative examples, harmonic identifier 300 performs a Fourier transform on sound data 306. The Fourier transform converts sound 218 from a time domain to a frequency domain. In the frequency domain, peaks in frequencies are identified. These peaks are used to identify harmonics 224 in sound data 306 in these illustrative examples. Harmonic identifier 300 generates harmonics data 307 for harmonics 224 identified in sound data 306.

In these illustrative examples, dispersion identifier 302 receives atmospheric data 308 from atmospheric condition sensor system 225. Atmospheric data 308 is data generated by the detection of number of atmospheric conditions 226 by atmospheric condition sensor system 225. Atmospheric data 308 includes information about number of atmospheric conditions 226 as detected by atmospheric condition sensor system 225.

As depicted, dispersion identifier 302 is configured to identify changes to the propagation of the speed of sound 218 using atmospheric data 308. Changes to the propagation of the speed of sound 218 are identified using number of atmospheric conditions 226 in atmospheric data 308.

These atmospheric conditions may include at least one of temperature, humidity, pressure, and other suitable atmospheric conditions. In these illustrative examples, the speed of sound 218 changes based on number of atmospheric conditions 226. Additionally, the speed of sound is also different for different frequencies for different harmonics in harmonics 224. As a result, the speed of each harmonic in harmonics 224 is a function of number of atmospheric conditions 226 and the frequency of the particular harmonic. Frequency information about the harmonics may be received from harmonic identifier 300.

Dispersion identifier 302 generates number of dispersion factors 310 from number of atmospheric conditions 226 in atmospheric data 308. Number of dispersion factors 310 is used by distance estimator 304 to make adjustments to speeds for harmonics 224. These adjustments are made to take into account number of atmospheric conditions 226 that cause atmospheric dispersion of sound 218.

In these illustrative examples, distance estimator 304 uses harmonics 224 and number of dispersion factors 310 to identify distance 222 to sound source 210. In these illustrative examples, distance estimator 304 is configured to identify number of phase delays 312 for harmonics 224. A phase delay in number of phase delays 312 is a phase delay between two harmonics in harmonics 224. Using number of phase delays 312, distance estimator 304 identifies number of time delays 314 for harmonics 224.

Distance estimator 304 identifies number of distances 316 using number of time delays 314 and number of dispersion factors 310. In these illustrative examples, a distance in number of distances 316 may be identified between any two harmonics in harmonics 224 in harmonics data 307. As a result, if more than one pair of harmonics is selected in harmonics 224, number of distances 316 is more than one distance in this illustrative example. When more than one distance is present, number of distances 316 may be averaged or otherwise analyzed to identify distance 222 in these illustrative examples.

For example, distance estimator 304 may identify first harmonic 318 and second harmonic 320 in harmonics 224 for processing. In these illustrative examples, the Fourier transformation of a sound signal from a time domain to a frequency domain is as follows:

$$F(k) = \sum_{n=0}^{N-1} s(n)\exp\left(-j\frac{2\pi}{N}nk\right), \quad (1)$$

$$k = 1, 2, \ldots, N-1$$

where $F(k)$ is the sound signal in the frequency domain, $s(n)$ is a sampled sound signal in the time domain, N is a sample length of the sampled sound signal, n is the time index of the sampled sound signal, and k is the frequency index of harmonic frequencies.

In the frequency domain, the set of spectral peaks are defined as follows:

$$PK = \{F(k), \forall k \in (1,N): F(k-1) < F(k) > F(k+1)\} \quad (2)$$

where PK is the spectral peaks. The harmonic frequencies are extracted from the set of spectral peaks. Each spectral peak is related to three Fourier coefficients. If $F(k)$ is a spectral peak, the harmonic frequency is estimated using the three coefficients by the following equation:

$$f_i = f_0 + \Delta f \frac{F(k-1) - F(k+1)}{2[F(k-1) + F(k+1) - 2F(k)]}, \quad (3)$$

$$i = 1, 2, \ldots, M$$

with $$\Delta f = \frac{f_s}{2N} \text{ and } f_0 = k\Delta f$$

where $f_i$ is a harmonic frequency, and $f_0$ is the discrete frequency at the frequency index k. $f_s$ is a sampling frequency, $\Delta f$ is the frequency difference between two adjacent discrete frequencies computed by fast Fourier transformation, and M is the number of extracted harmonic frequencies. In this example, equation (3) is used to estimate frequency between two discrete frequencies and provides a better resolution than the result of the fast Fourier transformation in Equation (1).

Distance estimator 304 also identifies phase delay 324. As depicted, phase delay 324 in number of phase delays 312 is a phase delay between first harmonic 318 and second harmonic 320.

In these illustrative examples, in calculating a phase delay, the phase of harmonic frequency $f_k$ is calculated from its complex Fourier transformation coefficient $F(k)$. The complex Fourier transformation coefficient is calculated as follows:

$$\phi_k = \tan^{-1}\left(\frac{b_k}{a_k}\right) \quad (4)$$

and $$F(k) = a_k + jb_k \quad (5)$$

The phase delay of two frequencies, is given by $$\Delta\phi_n = \phi_n - n\phi_1 \quad (6)$$

where $\phi_k$ is the phase of the complex Fourier transformation coefficient of $F(k)$, $a_k$ is the real part of $F(k)$, $b_k$ is the imaginary part of $F(k)$, $\phi_n$ is the phase of frequency $f_n$, $\phi_1$ is the phase of frequency $f_1$, $f_1$ is a reference frequency, and $f_n$ is the n selected harmonic frequency. With the phase delay, propagating time delay of two frequencies can be computed.

In these illustrative examples, $f_n$ and $f_1$ are selected. At least two harmonic frequencies are used to calculate the phase difference and dispersion. With the two frequencies, either one may be used as the reference frequency to estimate the phase difference and dispersion. Although this example shows two frequencies, other numbers of frequencies, such as 3, 6, 8, or some other number of frequencies, may be used.

Time delay 326 is identified by distance estimator 304 from phase delay 324 and represents time delay between first harmonic 318 and second harmonic 320. Time delay 326 is the amount of time that passes between receiving first harmonic 318 and receiving second harmonic 320 in these illustrative examples.

In identifying a time delay, the time delay of two harmonic frequencies is computed from their phase delays using the following equation:

$$\Delta t_n = t_n - t_1 = \frac{\Delta \phi_n}{2\pi f_n} \quad (7)$$

where $\Delta t_n$ is the time delay between two harmonic frequencies, $t_1$ is propagating time for reference frequency $f_1$; and $t_n$ is propagating time for frequency $f_n$ as selected by the index of harmonic frequencies n.

Distance estimator 304 identifies dispersion factor 322. Dispersion factor 322 in number of dispersion factors 310 is a dispersion factor for first harmonic 318 and second harmonic 320. In these illustrative examples, dispersion faction 322 may be an atmospheric dispersion factor.

In one illustrative example, in identifying number of dispersion factors 310, atmospheric dispersion of harmonics 224 is identified. According to the principles of physical acoustics, the propagation speed of sound in the atmosphere changes with number of atmospheric conditions 226 and sound frequency due to nitrogen and oxygen relaxation. The speed of sound is a function of frequencies of sound for given atmospheric conditions. The function is given as follows:

$$C(f) = C_0(f_0) DF(f, f_0) \quad (8)$$

with $$DF(f, f_0) = \sqrt{\frac{1 + \left(\frac{f}{f_0}\right)^2 (1+m)^2}{1 + \left(\frac{f}{f_0}\right)^2 (1+m)}} \quad (9)$$

and $$m = \frac{\alpha \lambda \left[1 + \left(\frac{f}{f_0}\right)^2\right]}{\pi \left(\frac{f}{f_0}\right)} \quad (10)$$

where C(f) is the speed of sound for different frequencies, f is any harmonic frequency from the sound signal, $C_0(f_0)$ is the reference sound speed for the reference frequency, $DF(f,f_0)$ is a ratio of propagation speeds at two different harmonic frequencies as defined in equation (9). $\lambda$ is the wavelength of sound waves, $\alpha$ is an atmospheric attenuation coefficient that depends on atmospheric temperature, humidity, and pressure.

In these illustrative examples, the atmospheric attenuation coefficient is calculated using the following equations:

$$\alpha = \quad (11)$$

$$\frac{P_s}{P_{s0}} F^2 \left\{ 1.84 * 10^{-11} \left(\frac{T}{T_0}\right)^{1/2} + \left(\frac{T}{T_0}\right)^{-5/2} \left[ 0.01278 * \frac{e^{-2239.1/T}}{F_{r,O} + F^2/F_{r,O}} + 0.1068 * \frac{e^{-3352/T}}{F_{r,N} + F^2/F_{r,N}} \right] \right\}$$

where $p_s$ is atmospheric pressure, $p_{s0}$ is the reference value of atmospheric pressure (1 atm), $F=f/p_s$, $F_{r,O}=f_{r,O}/p_s$ and $F_{r,N}=f_{r,N}/p_s$ are frequencies scaled by atmospheric pressure, f is a frequency in Hz, T is atmospheric temperature, and $T_0$ is the reference temperature. $T_0$ is 293.15 degrees K in this illustrative example.

The scaled relaxation frequencies for oxygen and nitrogen are calculated as follows:

$$F_{r,O} = \frac{1}{p_{s0}} \left( 24 + 4.04 * 10^4 h \frac{0.02 + h}{0.391 + h} \right) \quad (12)$$

and $$F_{r,N} = \frac{1}{p_{s0}} \left(\frac{T_0}{T}\right)^{1/2} \left( 9 + 280 h * \exp\left\{ -4.17 \left[ \left(\frac{T_0}{T}\right)^{1/3} - 1 \right] \right\} \right) \quad (13)$$

respectively, where h is the absolute humidity. The absolute humidity is computed as follows:

$$h = h_r \frac{p_{sat}/p_{s0}}{p_s/p_{s0}} \quad (14)$$

where $h_r$ is relative humidity and $p_{sat}$ is the saturation vapor pressure.

The acoustic dispersion factor of frequencies $f_1$ and $f_n$ is defined as follows:

$$\frac{\Delta C_n}{C_1} = \frac{C_n(f_n) - C_1(f_1)}{C_1(f_1)} = DF(f_n, f_1) - 1.0 \quad (15)$$

where $C_n$ is the speed of sound for the harmonic frequency identified by the index of the harmonic frequencies n, $C_1$ is the speed of sound for a reference harmonic frequency $f_1$, and $\Delta C_n$ is the difference in speed between harmonic frequency $f_n$ and the reference frequency $f_1$. The acoustic dispersion factor is used to estimate the distance between the acoustic source and the sensor.

Using this information, distance estimator 304 identifies distance 328 in number of distances 316. In identifying distance 328, the time delay of frequencies $f_n$ and $f_1$ can be represented as follows:

$$\Delta t_n = t_n - t_1 \quad (16)$$
$$= \frac{D}{C_n} - \frac{D}{C_1}$$
$$= -\frac{D}{C_n} \frac{\Delta C_n}{C_1}$$
$$= -\frac{D}{C_n} [DF(f_n, f_1) - 1.0]$$

where D is the distance between the acoustic source and the sensor. The distance D can be computed as follows:

$$D = \frac{-\Delta t_n C_n}{[DF(f_n, f_1) - 1.0]} \quad (17)$$

The illustration of location system 200 and the different components of location system 200 in FIG. 2 and FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative embodiments, the calculation of phase delays and time delays may be performed by harmonic identifier 300 instead of distance estimator 304. Additionally, the identification of number of distances 316 may be performed using other operations other than those described with respect to FIG. 3 that take into account the speed of harmonics 224 as affected by number of atmospheric conditions 226.

Figure 4:
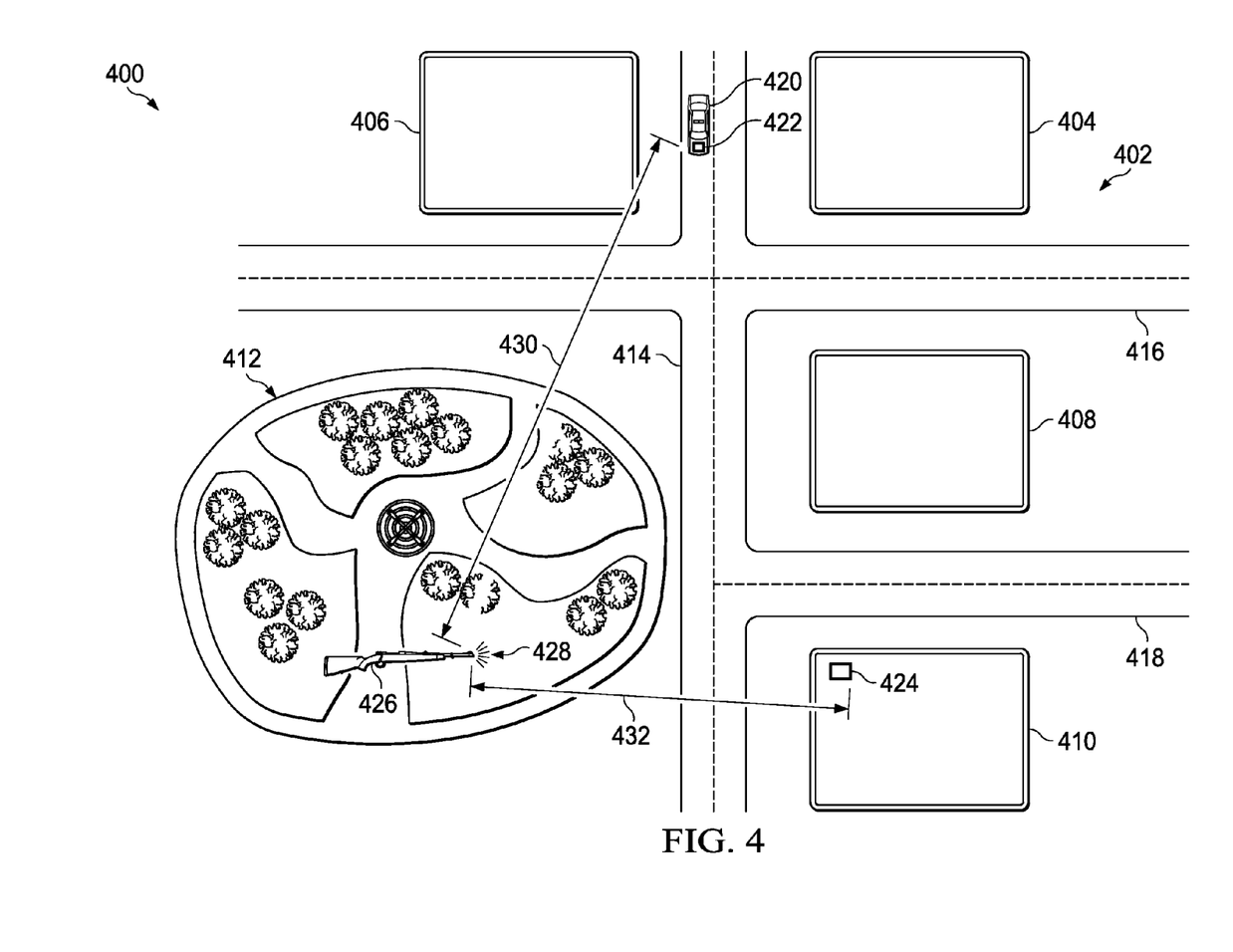
FIG. 4 is an illustration of a surveillance environment in accordance with an illustrative embodiment.

Turning now to FIG. 4, an illustration of a surveillance environment is depicted in accordance with an illustrative embodiment. Surveillance environment 400 is an example of yet another environment in which location system 200 may be used.

In this illustrative example, surveillance environment 400 is a top down view of a portion of city 402. In this illustrative example, city 402 includes buildings 404, 406, 408, and 410. City 402 also includes park 412. Roads 414, 416, and 418 also are present in city 402. Vehicle 420 is located on road 414 between building 404 and building 406.

In this illustrative example, vehicle 420 is an example of platform 206. Vehicle 420 may be a police van or other suitable type of vehicle. In this illustrative example, acoustic sensor system 422 is associated with vehicle 420. Acoustic sensor system 422 is another example of an acoustic sensor system in number of acoustic sensor systems 202 in location system 200 in FIG. 2. Vehicle 420 may perform surveillance for sound sources in city 402.

As another illustrative example, acoustic sensor system 424 is associated with building 410. Acoustic sensor system 424 is another example of an acoustic sensor system in number of acoustic sensor systems 202 in location system 200 in FIG. 2.

For example, if gun 426 generates sound 428, sound 428 may be detected by either or both of acoustic sensor system 422 and acoustic sensor system 424. In these illustrative examples, sound 428 may be multiple gunshots. Acoustic sensor system 422 may identify distance 430 from acoustic sensor system 422 to gun 426. Acoustic sensor system 424 may identify distance 432 between acoustic sensor system 424 and gun 426.

The locations of acoustic sensor system 422 and acoustic sensor system 424 along with distance 430 and distance 432 may be used to identify the location of gun 426. This location may be identified in two-dimensions and displayed on a map depending on the particular implementation.

If at least one of acoustic sensor system 422 and acoustic sensor system 424 are configured to provide additional location information in addition to distances, then a location in two or more dimensions may be identified with only one of the acoustic sensor systems.

The illustrations of surveillance environment 400 in FIG. 4 and the illustration of aircraft environment 100 in FIG. 1 are not meant to imply limitations to the manner in which a location system may be implemented. Location system 200 may be implemented in yet other environments in which identifying distance to sound sources is desirable. For example, location system 200 may be deployed on or near a battlefield. Further, location system 200 may be located in a helicopter or unmanned aerial vehicle and used to detect gun shots, explosions, or both in various locations in city 402 in FIG. 4.

Figure 5:
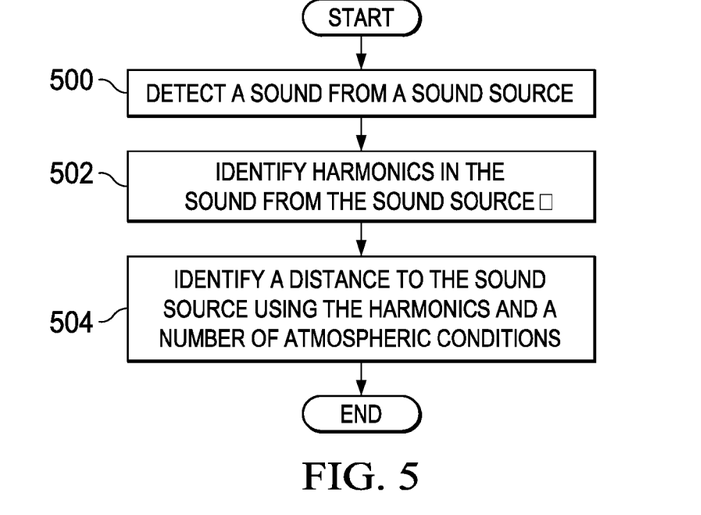
FIG. 5 is an illustration of a flowchart of a process for processing sound from a sound source in accordance with an illustrative embodiment.

With reference now to FIG. 5, an illustration of a flowchart of a process for processing sound from a sound source is depicted in accordance with an illustrative embodiment. This process may be implemented in location system 200 in FIG. 2. In particular, the process may be implemented by sound processor 214 in FIG. 2.

The process begins by detecting a sound from a sound source (operation 500). The process identifies harmonics in the sound from the sound source (operation 502). A distance to the sound source is identified using the harmonics and a number of atmospheric conditions (operation 504) with the process terminating thereafter.

Figure 6:
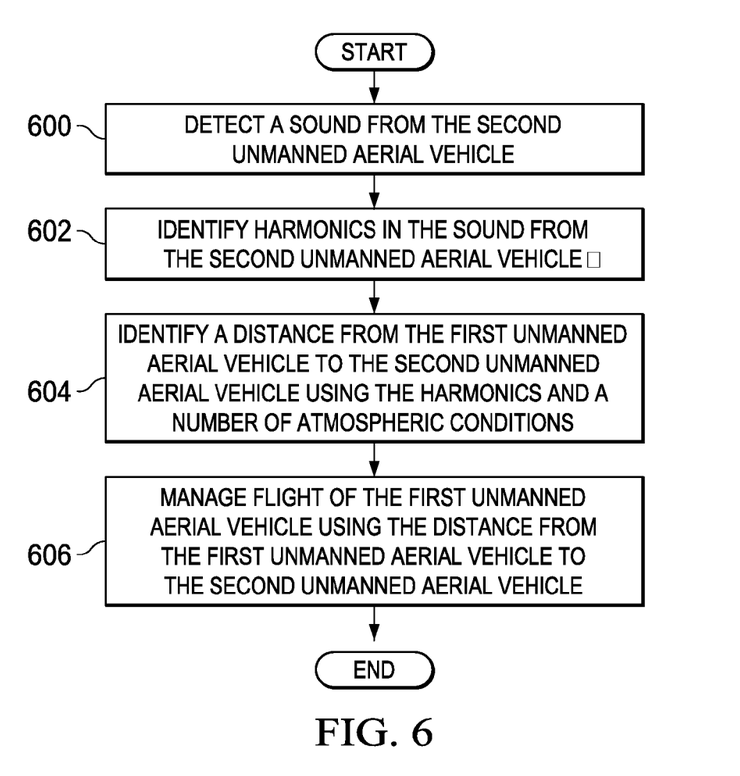
FIG. 6 is an illustration of a flowchart of a process for managing flight of unmanned aerial vehicles in accordance with an illustrative embodiment.

Turning now to FIG. 6, an illustration of a flowchart of a process for managing flight of unmanned aerial vehicles is depicted in accordance with an illustrative embodiment. The process illustrated in FIG. 6 may be implemented using location system 200 in FIG. 2 to manage aircraft in aircraft environment 100 in FIG. 1. The process may be used to manage flight of a first unmanned aerial vehicle relative to a second unmanned aerial vehicle.

The process begins by detecting a sound from the second unmanned aerial vehicle (operation 600). The process identifies harmonics in the sound from the second unmanned aerial vehicle (operation 602). A distance from the first unmanned aerial vehicle to the second unmanned aerial vehicle is identified using the harmonics and a number of atmospheric conditions (operation 604).

Flight of the first unmanned aerial vehicle is managed using the distance from the first unmanned aerial vehicle to the second unmanned aerial vehicle (operation 606) with the process terminating thereafter. In these illustrative examples, the distance may be relevant between the first unmanned aerial vehicle and the second unmanned aerial vehicle if they are at the same altitude. As a result, only distance may be needed to manage the flight of the unmanned aerial vehicles. Of course, when other information such as azimuth and elevation are present, a three-dimensional location of the second unmanned aerial vehicle may be identified.

Additional types of management of unmanned aerial vehicles may be performed when additional information is present. For example, the flight management of the unmanned aerial vehicle may be used to identify routing for operations such as surveillance or other types of data gathering. As a result, when additional information is present, other operations other than collision avoidance may be performed in managing the unmanned aerial vehicles.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 7:
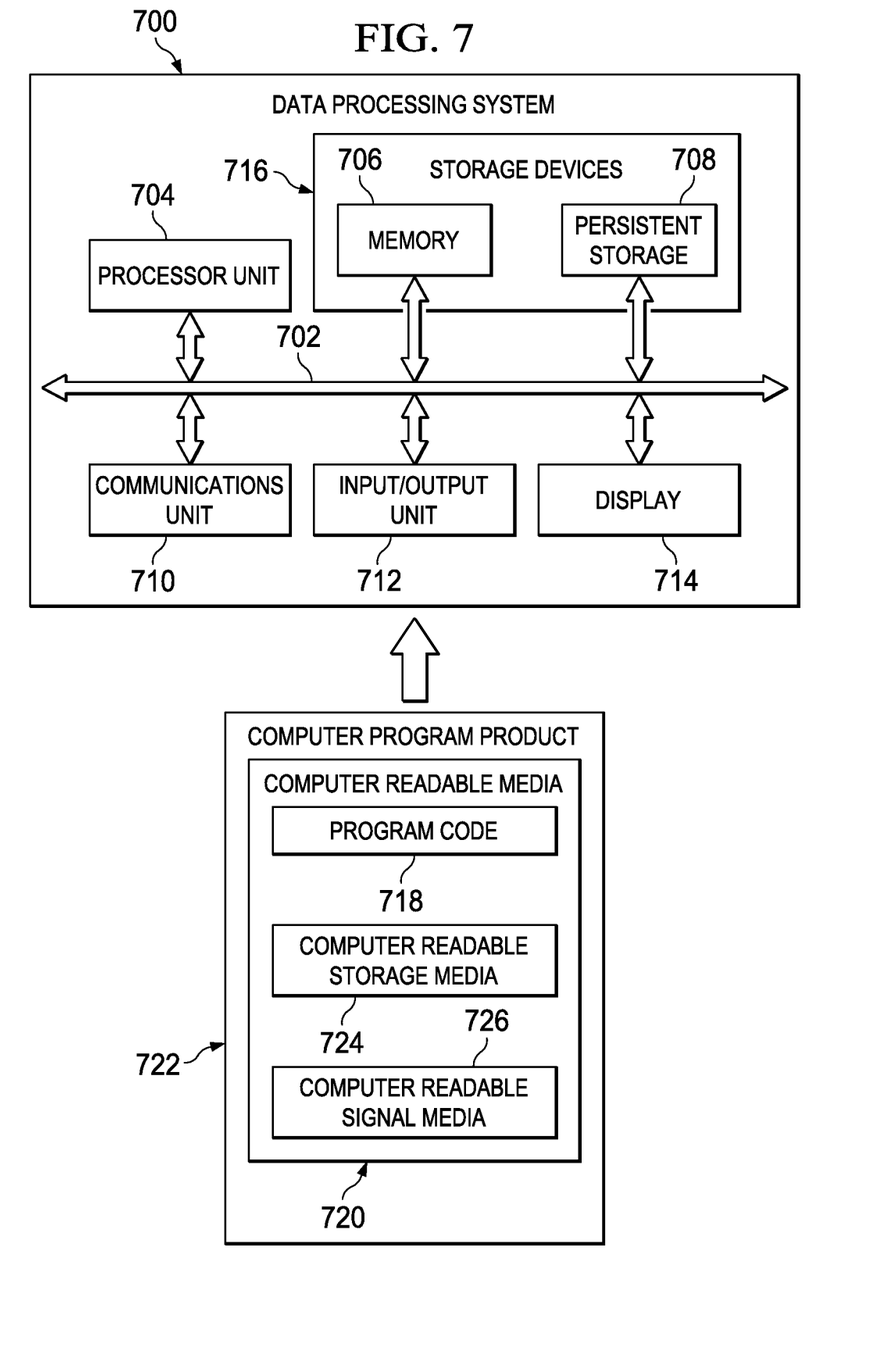
FIG. 7 is an illustration of a data processing system in accordance with an illustrative embodiment.

Turning now to FIG. 7, an illustration of a data processing system is depicted in accordance with an illustrative embodiment. Data processing system 700 may be used to implement computer system 219 in FIG. 2. In this illustrative example, data processing system 700 includes communications framework 702, which provides communications between processor unit 704, memory 706, persistent storage 708, communications unit 710, input/output (I/O) unit 712, and display 714. In this example, communication framework may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

Thus, the illustrative embodiments provide a method and apparatus for identifying location information about a sound source. With the illustrative examples, a distance between a sound source and sound sensor may be identified. The harmonics of the sound travel at different speeds through the atmosphere. The arrival times for different harmonics will be different. As a result, this information in conjunction with atmospheric conditions is used in the illustrative examples to identify distance between the sound source and the acoustic sensor system.

In this manner, the illustrative examples provide an ability to use acoustic sensors that do not emit energy. As a result, the operation of a location system implemented in accordance with an illustrative embodiment may be more difficult to detect as compared to an active sensor system such as a radar system. The use of this type of location system may be especially useful in unmanned aerial vehicles in which detection of the presence of those vehicles may be undesirable. Further, the use of a location system in accordance with an illustrative embodiment may also be useful in any sort of vehicle or platform in which detection of the operation of the platform is undesirable.

Additionally, this type of system uses less energy than active location systems. As a result, the reduced energy use may be useful in vehicles in which the power provided by the vehicle may be limited.

Further, in addition to using location system 200 for identifying distances to other vehicles, location system 200 also may be used to identify a location of the vehicle in two-dimensional space or three-dimensional space.

The illustrative embodiments also may implement location system 200 for other uses other than vehicles for determining distances to other vehicles. For example, location system 200 also may be used in monitoring systems or surveillance systems. For example, location system 200 may be used to identify a location of gunfire, explosions, and other types of sounds.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing sound from a sound source, the method comprising:
   detecting the sound from the sound source, wherein sounds are received as sound data from an acoustic sensor system positioned on a vehicle;
   identifying harmonics in the sound from the sound source including converting the sound data from a time domain to a frequency domain using a Fourier transform, identifying spectral peaks in frequencies in the sound data in the frequency domain, and identifying the harmonics from the spectral peaks;
   identifying a number of atmospheric conditions and an atmospheric dispersion factor for the harmonics; and
   identifying a distance to the sound source from the acoustic sensor system using the harmonics, the number of atmospheric conditions, and the atmospheric dispersion factor, including identifying a time delay between a first harmonic and a second harmonic in the harmonics and identifying the distance to the sound source using the time delay between the first harmonic and the second harmonic and atmospheric dispersion caused by the number of atmospheric conditions.

2. The method of claim 1 further comprising:
   identifying a location of the sound source using the distance to the sound source and at least one of an azimuth to the sound source and an elevation to the sound source.

3. The method of claim 1 further comprising:
   identifying at least one of an azimuth and an elevation to the sound source from the sound.

4. The method of claim 1, wherein identifying the distance to the sound source using the time delay between the first harmonic and the second harmonic and the atmospheric dispersion caused by the number of atmospheric conditions comprises:
   identifying the distance to the sound source using the time delay between the first harmonic and the second harmonic from the same sound source and an atmospheric dispersion factor, wherein the atmospheric dispersion factor takes into account dispersion caused by the number of atmospheric conditions for the first harmonic and the second harmonic.

5. The method of claim 1, wherein identifying the time delay between the first harmonic and the second harmonic in the harmonics comprises:
   identifying a phase delay between a first frequency for the first harmonic and a second frequency for the second harmonic; and
   identifying the time delay between the first harmonic and the second harmonic using the phase delay.

6. The method of claim 1, further comprising the step of generating an alert based on distance.

7. The method of claim 1, wherein the vehicle is a first unmanned aerial vehicle, and the distance is from the acoustic sensor system to a second unmanned aerial vehicle and further comprising:
   managing flight of the first unmanned aerial vehicle to avoid collision with the second unmanned aerial vehicle using the distance.

8. The method of claim 1, wherein the distance is used to identify a location of the sound source generating a plurality of gunshots resulting in the harmonics in the sound.

9. The method of claim 1, wherein the number of atmospheric conditions is selected from at least one of humidity, pressure, and temperature.

10. The method of claim 1, wherein the sound source is selected from one of an aircraft, an unmanned aerial vehicle, and a gun.

11. A method for managing flight of a first unmanned aerial vehicle relative to a second unmanned aerial vehicle, the method comprising:
    detecting a sound from the second unmanned aerial vehicle, wherein the sound is received as sound data from an acoustic sensor system;
    identifying harmonics in the sound from the second unmanned aerial vehicle source, including converting the sound data from a time domain to a frequency domain using a Fourier transform, identifying spectral peaks in frequencies in the sound data in the frequency domain, and identifying the harmonics from the spectral peaks;
    identifying a number of atmospheric conditions and an atmospheric dispersion factor for the harmonics;
    identifying a distance from acoustic sensor system to the second unmanned aerial vehicle using the harmonics, the number of atmospheric conditions, and the atmospheric dispersion factor, including identifying a time delay between a first harmonic and a second harmonic in the harmonics; and identifying the distance to the sound source using the time delay between the first harmonic and the second harmonic and atmospheric dispersion caused by the number of atmospheric conditions; and
    managing the flight of the first unmanned aerial vehicle using the distance from the first unmanned aerial vehicle to the second unmanned aerial vehicle.

12. The method of claim 11 further comprising:
    identifying at least one of an azimuth to the second unmanned aerial vehicle and an elevation to the second unmanned aerial vehicle.

13. The method of claim 12, wherein managing the flight of the acoustic sensor system using the distance from the first unmanned aerial vehicle to the second unmanned aerial vehicle comprises:
    managing the flight of the acoustic sensor system using the distance from the first unmanned aerial vehicle to the second unmanned aerial vehicle and at least one of the azimuth towards the second unmanned aerial vehicle and the elevation to the second unmanned aerial vehicle.

14. The method of claim 11, wherein managing the flight of the first unmanned aerial vehicle using the distance from the acoustic sensor system to the second unmanned aerial vehicle comprises:
    managing the flight of the acoustic sensor system using the distance from the first unmanned aerial vehicle to the second unmanned aerial vehicle to avoid an undesired distance between the first unmanned aerial vehicle and the second unmanned aerial vehicle.

15. An apparatus comprising:
    a sensor system configured to detect a sound from a sound source, wherein the sound is received as sound data from an acoustic sensor system positioned on a vehicle; and
    a sound processor configured to:
    identify harmonics in the sound from the sound source, including converting the sound data from a time domain to a frequency domain using a Fourier transform, identifying spectral peaks in frequencies in the sound data in the frequency domain, and identifying the harmonics from the spectral peaks;

identify a number of atmospheric conditions and an atmospheric dispersion factor for the harmonics; and identify a distance to the sound source from the acoustic sensor system using the harmonics, the number of atmospheric conditions, and the atmospheric dispersion factor, including identifying a time delay between a first harmonic and a second harmonic in the harmonics and identifying the distance to the sound source using the time delay between the first harmonic and the second harmonic and atmospheric dispersion caused by the number of atmospheric conditions.

16. The apparatus of claim 15, wherein the sound processor comprises:

a distance identifier configured to identify the harmonics in the sound from the sound source and identify the distance to the sound source using the harmonics and the number of atmospheric conditions, and wherein the sound processor is configured to generate an alert based on distance.

17. The apparatus of claim 16, wherein the sound processor further comprises:

an elevation identifier configured to identify an elevation of the sound source.

18. The apparatus of claim 16, wherein the sound processor further comprises:

an azimuth identifier configured to identify an azimuth to the sound source.

19. The apparatus of claim 15, wherein the sound processor is configured to identify a location of the sound source using the distance to the sound source and at least one of an azimuth to the sound source and an elevation to the sound source.

* * * * *